United States Patent [19]

Yamamoto

[11] 4,331,405
[45] May 25, 1982

[54] CAMERA WITH SPEED LIGHT DEVICE

[75] Inventor: Hiroshi Yamamoto, Yokohama, Japan

[73] Assignee: Canon Kabushiki Kaisha, Tokyo, Japan

[21] Appl. No.: 265,163

[22] Filed: May 19, 1981

[30] Foreign Application Priority Data

May 20, 1980 [JP] Japan .................................. 55-66952

[51] Int. Cl.³ ............................................ G03B 15/03
[52] U.S. Cl. .................................................... 354/126
[58] Field of Search ................................ 354/126–149

[56] References Cited

FOREIGN PATENT DOCUMENTS 866608  2/1953  Fed. Rep. of Germany ...... 354/126
954840  12/1956 Fed. Rep. of Germany ...... 354/126
54-123945 9/1979  Japan .................................. 354/145

Primary Examiner—John Gonzales
Attorney, Agent, or Firm—Toren, McGeady and Stanger

[57] ABSTRACT

A single lens reflex camera with a built-in speed light device which can be withdrawn into a position not obstructing camera operation, and which can be brought to the ready position by one touch operation. The speed light device is folded into the withdrawn position in which the light emitting surface is in contact with the upper surface of the camera by an urging member and when it is brought into the standing state, the light emitting surface is rotated into the photographing direction in such a manner that when the speed light device is used, the device is brought out of the folded state into the ready state by means of the strength of the urging member.

4 Claims, 6 Drawing Figures

CAMERA WITH SPEED LIGHT DEVICE

BACKGROUND OF THE INVENTION

1. Field of the Invention

The present invention relates to a speed light device particularly for a single lens reflex camera with a built-in automatic winding mechanism.

2. Description of the Prior Art

Recent advances in automation and electronification of cameras have enabled operation of the speed light device and of the film winding and rewinding mechanism built in the camera body to be accomplished by means of a single power source. Many of these automatic cameras are of the the compact type with a lens shutter system. However, single lens reflex cameras with interchangeable lens assemblies using both the speed light device and the automatic winding mechanism usually have these devices mounted on the camera as exclusive accessories in accordance with necessity. In case of a compact camera with the noninterchangeable lens, the photographing lens is fixed on the camera, so that a signal representing the distance from the object can easily be derived from the lens and light adjustment for flash photography is accomplished by means of the distance information. Consequently, the electrical circuitry can be simplified and the number of the parts for the speed light device can be reduced. Thus, even if the speed light device is built in the camera the outer dimension of the camera can be made comparatively small so that cameras with a built in speed light device or built in automatic winding mechanism have been brought into practical use.

On the other hand, in the single lens reflex camera lenses with different focal lengths can be interchangeably used. Each of these lenses involve different distance information so that it is not easy, as in case of the lens shutter camera, to apply the distance information from the lens side into the circuit at the camera side in order to effect flash adjustment. Accordingly, a speed light device for the single lens reflex camera usually requires a computer system. The circuit of this speed light device with the computer system is relatively complicated, and it is necessary to make available the maximum amount of flash light from the light emitting element. Thus, the outer dimension of the speed light device becomes too large to be built in the camera without enlarging the outer dimension of the camera.

Recent advances in miniaturization of electronic circuits have enabled the development of camera circuitry which is quite small. However, although the circuit for the computer speed light device can be made very small, the dimensions of a light emitting element having a large enough capacity for the single lens reflex camera, and the reflector and the main condenser therefor, cannot be made small, so that even if the important parts of the speed light device are contained in the camera body the outer dimension of the camera becomes too large to be used conveniently. This makes ordinary camera operation without using the speed light device troublesome.

SUMMARY OF THE INVENTION

In accordance with the present invention a speed light device is built in a single lens reflex camera and when the speed light device is not used it does not become an obstacle to operation of the camera. When the speed light device is used the light emitting element can assume a proper distance from the optical axis of the lens in such a manner that the same power source can be used in common not only for the motor drive of the camera but also for the light measuring and the distance measuring mechanism. In accordance with an embodiment of the present invention the shutter release mechanism and the mode change over mechanism are arranged at a grip portion provided at one side of the camera so as to have the power source magazine in such a position that at the side of the grip on the upper surface of the camera the speed light device loading portion is provided. Thus, by means of a rotary mechanism provided on the upper part at the camera side the important parts of the speed light device consisting of the flash light emitting part and the main condenser can be folded into the loading portion.

By a further aspect of the present invention there is provided a camera with a built-in speed light device so designed that the speed light device case is arranged so as to be rotated vertically and horizontally, whereby the front side of the speed light device which is not used is brought into contact with the upper surface of the camera body, while the speed light device which is used is made to stand up by means of a member for urging the speed light device vertically and horizontally out of the loaded state and the front part of the speed light device is made to face the object.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENT

Figure 1:
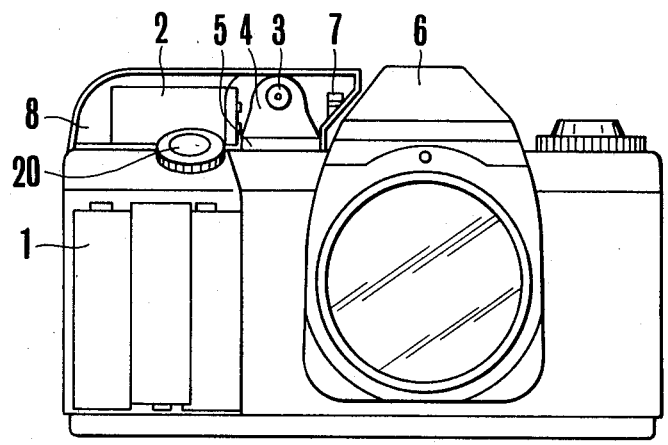
FIG. 1 shows an embodiment of the single lens reflex camera with the speed light device in accordance with the present invention in elevation.
Figure 2:
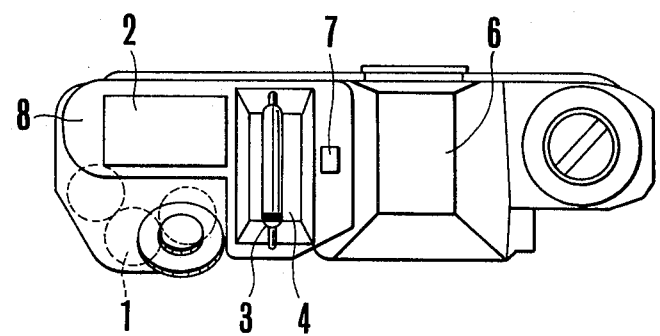
FIG. 2 is a top view of the camer shown in FIG. 1.
Figure 3:
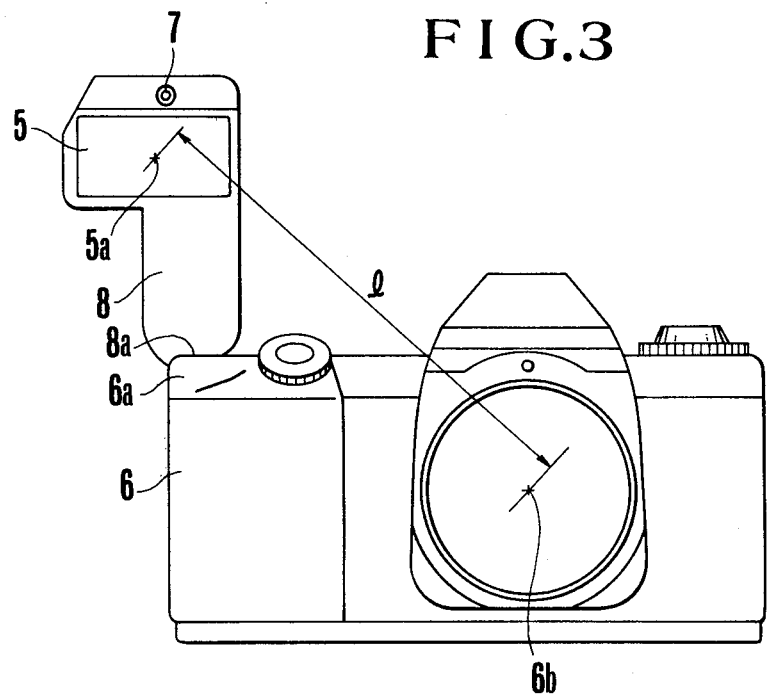
FIG. 3 shows the camera of FIG. 1 in elevation, wherein the speed light device is in the ready position.
Figure 4:
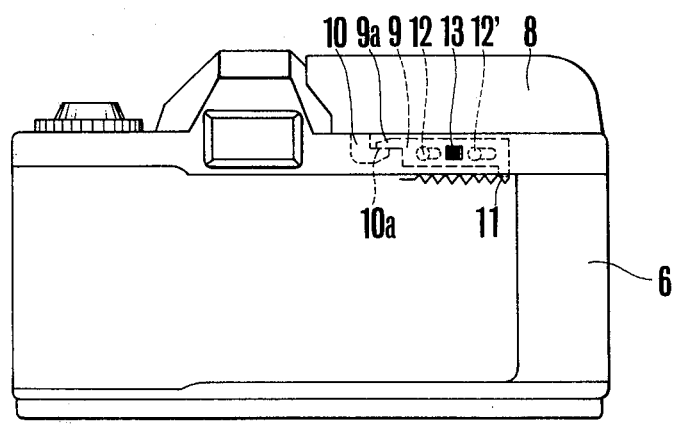
FIG. 4 is a rear view of the camera shown in FIG. 1, showing the speed light device when not in use.

FIG. 1 shows an embodiment of the invention applied in a single lens reflex camera having a speed light device in accordance with the present invention. FIG. 2 shows the camera shown in FIG. 1, seen from above. FIG. 3 shows the camera with the speed light device shown in FIG. 1, whereby the speed light device is in the ready position. FIG. 4 shows the camera shown in FIG. 1, seen from the back. In FIG. 1, the speed light device is withdrawn in the camera body. In the drawing, 1 is the power source, comprising several batteries contained in the camera for supplying current to various circuits in the camera body, including the automatic winding and rewinding mechanisms and the speed light device. 2 is the main condenser for the speed light device, 3 is the flash light discharge tube, 4 is the reflector, 5 is the front protector for the discharge tube and 7 is the light sensing element for the speed light computer. The elements 2 to 7 are contained in the case 8 for the speed light unit. 20 is the release button. As is shown in FIG. 2, the main condenser 2 is arranged horizontally along the lengthwise direction of the camera body when the speed light device is withdrawn as is shown in FIG. 1, while the flash light discharge tube 3 and the reflector 4 are arranged vertically to the main condenser 2. When the speed light device is withdrawn in the camera body, the protector 5 for the light emitting portion is in contact with the upper surface of the camera body in such a manner that not only the surface of the protector is protected but also the outer case of the speed light device does not hinder camera operation at the time of ordinary photography (without using the speed light). Because the camera of the present embodiment has the automatic winding mechanism driven with the built-in power source, the film winding lever is not needed so that there is no obstacle on the upper surface of the camera for the speed light device to be withdrawn. Thus, it is possible to put the speed light along the upper surface of the camera, whereby if the height of the withdrawn speed light device is made equal to or smaller than that of the cover of the pentagonal prism of the camera the shape of the portable camera case can be made the same as that of the case for the camera having no speed light device. Further, the space for the light emitting portion can be made larger than the thickness of the camera grip and the camera body so that it is possible to obtain a sufficiently powerful power source for the flash light discharge. As is shown in FIG. 3, the distance l between the light emitting portion when the speed light device is in use and the optical axis of the photographing lens can be chosen sufficiently large, the position being taken in such a manner that there is no problem with regard to "Red Eye" which is a phenomenon peculiar to speed light photography and with regard to vignetting at small distance photography by means of the long focal length lens. In order that when the speed light device is used the case 8 is rotated out of the position shown in FIG. 1 by 90°, a connecting mechanism to be explained later is arranged between the one end 8a of the case 8 and the connecting portion 6a of the camera body. Further, as is shown in FIG. 4, by sliding the knob 13 provided at the back of the camera the movable claw arranged in the body is moved toward the right against the strength of the spring 11 in such a manner that the claw 9a is disengaged from the fixed claw 10 at the side of the speed light device case so that the speed light device stands up by one touch by means of a spring (not shown) to bring the light into the ready position. Further it is possible that the power source switch not shown for the speed light circuit may be opened or closed in operative engagement with the claw 9 or 10 in a conventional way.

Figure 5:
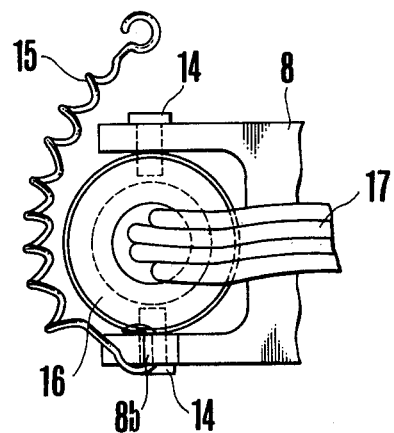
FIG. 5 is a plan view showing the connection of the speed light device case to the camera body.
Figure 6:
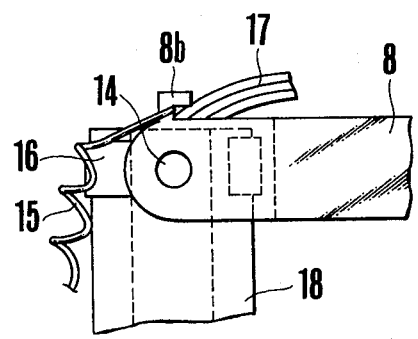
FIG. 6 shows the part in FIG. 5, in side view.

FIGS. 5 and 6 respectively show the plan and the side view of the important part of an embodiment of the connection of the speed light device case 8 in accordance with the present invention with the camera body 6. In the drawing, the speed light device case 8 can be rotated by 90° into a position vertical to the camera body, whereby the pins 14 are inserted in the holes of the two arms provided at the one end of the case 8. 16 is a rotary ring provided in the camera body, which is diametrically provided with two pins, around which the speed light device case 8 is rotated. Further, the rotary ring 16 is rotatable around the axis 18 fixed on the camera body along the direction of the upper surface of the camera body. The one arm of the case 8 is provided with a hook 8b for the spring 15, whose other end is engaged with the camera body, whereby the spring 15 urges the case 8 so as to rotate it around the pin 14 and the axis 18. Consequently, when the fixed claw 10a shown in FIG. 4 is disengaged by means of the strength of the spring 15 the case 8 which is rotated by 90° stands up at right angle by means of the stopper in such a manner that the flash light emitting window is directed along the direction of the camera. The conductor 17 for the main condenser, the flash light discharge tube and the light sensing element in the speed light device case 8 and for the speed light computing circuit and the power source in the camera body is conducted through the fixed axis 18 at the side of the body so as to avoid trouble due to the twisting of the conductors at the time of rotating the speed light device case. In order to withdraw the speed light device case 8 the case 8 is manually folded against the strength of the spring 15, whereby the claw 10a of the case is engaged with that 9a of the body in such a manner that the speed light device case 8 is fixed at the withdrawn position.

As explained above, in the case of a single lens reflex camera with the speed light device in accordance with the present invention, when the speed light device is not used the speed light device is folded down on the upper surface of the camera, while when the speed light device is used, it is brought by operation with one hand into the effective position at which the flash light emitting window is properly directed. This contributes significantly to the realization of a camera which is quite convenient not only when the camera is used by also when the camera is carried.

As is explained above, the single lens reflex camera with the speed light device in accordance with the present device is so designed that the important part of the speed light device can be folded apart from the camera body in such a manner that when the speed light device is not used or when the camera is carried the flash light emitting window is brought into contact with the upper surface of the camera so as to be protected, while when the camera is put in the camera case for transportation the dead space of the case can be made use of effectively. Further, when the speed light device is used the light emitting portion can be kept in a proper distance from the optical axis of the lens so that not only can red eye phenomenon during speed light photography be avoided but also the vignetting by means of the lens barrel of the long focal length lens can be eliminated, which is advantageous.

While a specific embodiment of the invention has been shown and described in detail to illustrate the application of the inventive principles, it will be understood that the invention may be embodied otherwise without departing from such principles.

What is claimed is:
1. A camera including a camera body comprising:
  a speed light device arranged on the upper surface of said camera body so as to be rotated, said speed light device having a light emitting plane and being loaded in a state in which said light emitting plane is in contact with the upper surface of the camera body when said speed light device is not used; and
  urging means for urging said speed light device to an upright position on said camera body with said light emitting plane directed along the photographing direction of said camera when said speed light device is used.

2. A camera including a camera body comprising:
(a) a speed light device having a case end mounted on the end of the upper surface of said camera body so as to be rotated vertically and horizontally;
(b) holding means for holding said speed light device in a folded state upon the upper surface of said camera body, whereby the light emitting plane of said speed light device in the folded state faces the upper surface of said camera body; and
(c) urging means for urging said speed light device out of said folded state into an upright position and rotated so that the light emitting plane is directed along the photographing direction of said camera, said urging means being brought into operation with the release of said holding means.

3. A single lens reflex camera including a camera body, comprising:
(a) a rotary member provided at the end of said camera body, said member being mounted so as to be rotated along the same plane as the upper surface of said camera body;
(b) a speed light device having a case end mounted on said rotary member so as to be rotated vertically relative to said rotary member, said device being held in a folded state upon the upper surface of said camera body in such a manner that the light emitting plane of said speed light device faces the upper surface of said camera body; and
(c) uriging means engaged with said speed light device and said camera body, said urging means urging said speed light device to an upright position by rotating it vertically to said rotary member, said rotary member being rotated in such a manner that the light emitting plane of said speed light device is directed along the photographing direction of said camera.

4. A single lens reflex camera according to claim 3, wherein said urging means is a spring member.

* * * * *